(12) United States Patent
Ono

(10) Patent No.: US 10,910,982 B2
(45) Date of Patent: Feb. 2, 2021

(54) AIR CONDITIONER

(71) Applicant: Mitsubishi Electric Corporation, Tokyo (JP)

(72) Inventor: Yoshihito Ono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/835,395

(22) Filed: Mar. 31, 2020

(65) Prior Publication Data

US 2020/0228042 A1 Jul. 16, 2020

Related U.S. Application Data

(62) Division of application No. 15/739,192, filed as application No. PCT/JP2015/079457 on Oct. 19, 2015, now Pat. No. 10,700,626.

(51) Int. Cl.
*H02P 27/06* (2006.01)
*H02P 6/00* (2016.01)
(Continued)

(52) U.S. Cl.
CPC ............... *H02P 27/06* (2013.01); *H02P 6/00* (2013.01); *F25B 31/02* (2013.01); *H02P 5/74* (2013.01)

(58) Field of Classification Search
CPC .... H02P 27/06; H02P 6/00; H02P 5/74; F25B 31/02
See application file for complete search history.

(56) References Cited

U.S. PATENT DOCUMENTS 4,025,726 A * 5/1977 Matsuyama ........... H04Q 3/521
379/306
4,315,205 A * 2/1982 Mori ....................... H02J 7/166
322/99
(Continued)

FOREIGN PATENT DOCUMENTS

CN 104685782 A 6/2015
EP 2 903 150 A1 8/2015
(Continued)

OTHER PUBLICATIONS

International Search Report of the International Searching Authority dated Dec. 15, 2015 for the corresponding International application No. PCT/JP2015/079457 (and English translation).
(Continued)

*Primary Examiner* — Eduardo Colon Santana
*Assistant Examiner* — Devon A Joseph
(74) *Attorney, Agent, or Firm* — Posz Law Group, PLC

(57) ABSTRACT

An air conditioner includes: a power generating unit that generates drive power for driving the air conditioner; an output unit that drives a motor; a detecting unit that detects a DC voltage applied to the output unit; a motor drive control unit that controls the output unit based on a detection result from the detecting unit; a drive power supply unit that supplies an operating power source to the output unit and the motor drive control unit; a main body control unit that outputs a motor drive command or a motor drive stop command to the supply unit; a power circuit unit that supplies operating power to the main body control unit and the supply unit; and an input changeover switch that inputs the detection result to the motor drive control unit as the motor is driven, and cuts off input of the detection result as the motor stops.

2 Claims, 17 Drawing Sheets

(51) Int. Cl.
*F25B 31/02* (2006.01)
*H02P 5/74* (2006.01)

(56) References Cited

U.S. PATENT DOCUMENTS

| | | | | |
|---|---|---|---|---|
| 5,315,533 A | * | 5/1994 | Stich | H02J 9/062 |
| | | | | 700/298 |
| 5,757,168 A | | 5/1998 | DeVale | |
| 5,793,623 A | | 8/1998 | Kawashima et al. | |
| 9,362,048 B2 | | 6/2016 | Yamamoto | |
| 10,236,792 B2 | * | 3/2019 | Suzuki | H02P 29/0241 |
| 2001/0010639 A1 | * | 8/2001 | Shirato | H02M 3/28 |
| | | | | 363/89 |
| 2006/0186850 A1 | * | 8/2006 | Kurita | H02P 5/74 |
| | | | | 318/599 |
| 2010/0192788 A1 | * | 8/2010 | Tanaka | H02M 7/797 |
| | | | | 100/214 |
| 2011/0218652 A1 | * | 9/2011 | Gorny | D06F 58/30 |
| | | | | 700/21 |
| 2012/0025875 A1 | * | 2/2012 | Fukuta | H02M 1/32 |
| | | | | 327/109 |
| 2012/0126733 A1 | * | 5/2012 | EL-Refaie | H02P 25/024 |
| | | | | 318/400.26 |
| 2012/0286717 A1 | * | 11/2012 | Fukuta | B60L 50/61 |
| | | | | 318/722 |
| 2014/0028237 A1 | * | 1/2014 | Park | H02P 21/20 |
| | | | | 318/504 |
| 2014/0062361 A1 | * | 3/2014 | Suzuki | H02M 7/5387 |
| | | | | 318/400.17 |
| 2014/0092653 A1 | * | 4/2014 | Suzuki | H03K 17/691 |
| | | | | 363/55 |
| 2014/0104350 A1 | | 4/2014 | Urabe | |
| 2014/0307492 A1 | * | 10/2014 | Suzuki | H02M 1/08 |
| | | | | 363/56.01 |
| 2014/0307495 A1 | * | 10/2014 | Fukuta | H02H 3/08 |
| | | | | 363/98 |
| 2014/0340948 A1 | * | 11/2014 | Suzuki | H03K 17/567 |
| | | | | 363/40 |
| 2015/0151548 A1 | | 6/2015 | Urabe | |
| 2015/0365037 A1 | * | 12/2015 | Watabu | H02J 3/32 |
| | | | | 318/400.3 |
| 2016/0245571 A1 | | 8/2016 | Shinomoto et al. | |
| 2016/0329844 A1 | | 11/2016 | Sato et al. | |
| 2018/0062546 A1 | * | 3/2018 | Xiang | H02P 3/18 |
| 2018/0367032 A1 | * | 12/2018 | Hayashi | H02M 1/32 |

FOREIGN PATENT DOCUMENTS

| | | |
|---|---|---|
| EP | 2903150 A1 | 8/2015 |
| JP | H10-205854 A | 8/1998 |
| JP | H11-311436 A | 11/1999 |
| JP | 2000-179923 A | 6/2000 |
| JP | 2010-080099 A | 4/2010 |
| JP | 2012-120409 A | 6/2012 |
| JP | 2014-076630 A | 5/2014 |
| JP | 2014-081195 A | 5/2014 |

OTHER PUBLICATIONS

Office Action dated Apr. 17, 2018 issued in corresponding JP patent application No. 2017-546294 (and English translation).
Extended European Search Report dated May 3, 2019 issued in corresponding EP patent application No. 15906636.4.
Office Action dated Oct. 30, 2019 issued in corresponding CN patent application No. 201580082728.6 (and partial English machine translation).

\* cited by examiner

AIR CONDITIONER

CROSS REFERENCE TO RELATED APPLICATION

This application is a divisional of U.S. application Ser. No. 15/739,192 (now U.S. Pat. No. 10,700,626) filed on Dec. 22, 2017, which is a U.S. national stage application of International Patent Application No. PCT/JP2015/079457 filed on Oct. 19, 2015, the contents of which are incorporated herein by reference.

TECHNICAL FIELD

The present invention relates to a drive control technique for a motor provided in an air conditioner, and more particularly to the reduction of power consumption of an air conditioner and circuit protection for the reduction of power consumption.

BACKGROUND

One prior art reference discloses monitoring a DC voltage as a motor is driven and reflecting the monitoring result on motor control to drive the motor (for example, refer to Patent Literature 1). Another prior art reference discloses a technique for reducing power consumption as a motor is not in operation by using a relay to cut off a DC voltage applied to an inverter output unit (for example, refer to Patent Literature 2).

PATENT LITERATURE

Patent Literature 1: Japanese Patent Application Laid-open No. 2012-120409
Patent Literature 2: Japanese Patent Application Laid-open No. H11-311436

For the technique of Patent Literature 1 mentioned above, unfortunately, the power is wastefully consumed despite the motor being not driven because a voltage detecting circuit and an inverter control device are always in operation as the motor stops being driven.

For the technique of Patent Literature 2 mentioned above, unfortunately, it is necessary to provide an expensive relay for reducing power consumption, resulting in an increase in cost. Another problem with the technique of Patent Literature 2 is that since the area occupied by the relay is large, the size of the device increases.

SUMMARY

The present invention has been made in view of the above-mentioned problems, and an object of the present invention is to provide an air conditioner capable of suppressing the increase in device scale and increase in cost, and reducing the power consumption as the motor is not driven.

In order to solve the above-mentioned problems and to achieve the object, an air conditioner according to the present invention comprises: a power generating unit to convert an AC voltage applied from a commercial power source into a DC voltage to generate drive power for driving the air conditioner; an inverter output unit to drive the motor by using power supplied from the power generating unit; a voltage detecting unit to detect a DC voltage applied to the inverter output unit; a motor drive control unit to control the inverter output unit on a basis of a detection result from the voltage detecting unit; a drive power supply unit to supply an operating power source to each of the inverter output unit and the motor drive control unit; a main body control unit to transmit and receive signals to and from the motor drive control unit, and output a motor drive command or a motor drive stop command to the drive power supply unit; a power circuit unit to supply operating power to the main body control unit and the drive power supply unit by using the drive power generated by the power generating unit; and a detection result inhibiting circuit to input the detection result from the voltage detecting unit to the motor drive control unit as the motor is driven, and cut off input of the detection result to the motor drive control unit as the motor stops being driven.

The present invention can achieve the effect of suppressing the increase in device scale and increase in cost, and reducing the power consumption as the motor is not driven.

DETAILED DESCRIPTION

Hereinafter, an air conditioner according to embodiments of the present invention will be described with reference to the accompanying drawings. The present invention is not limited to the following embodiments.

First Embodiment

Figure 1:
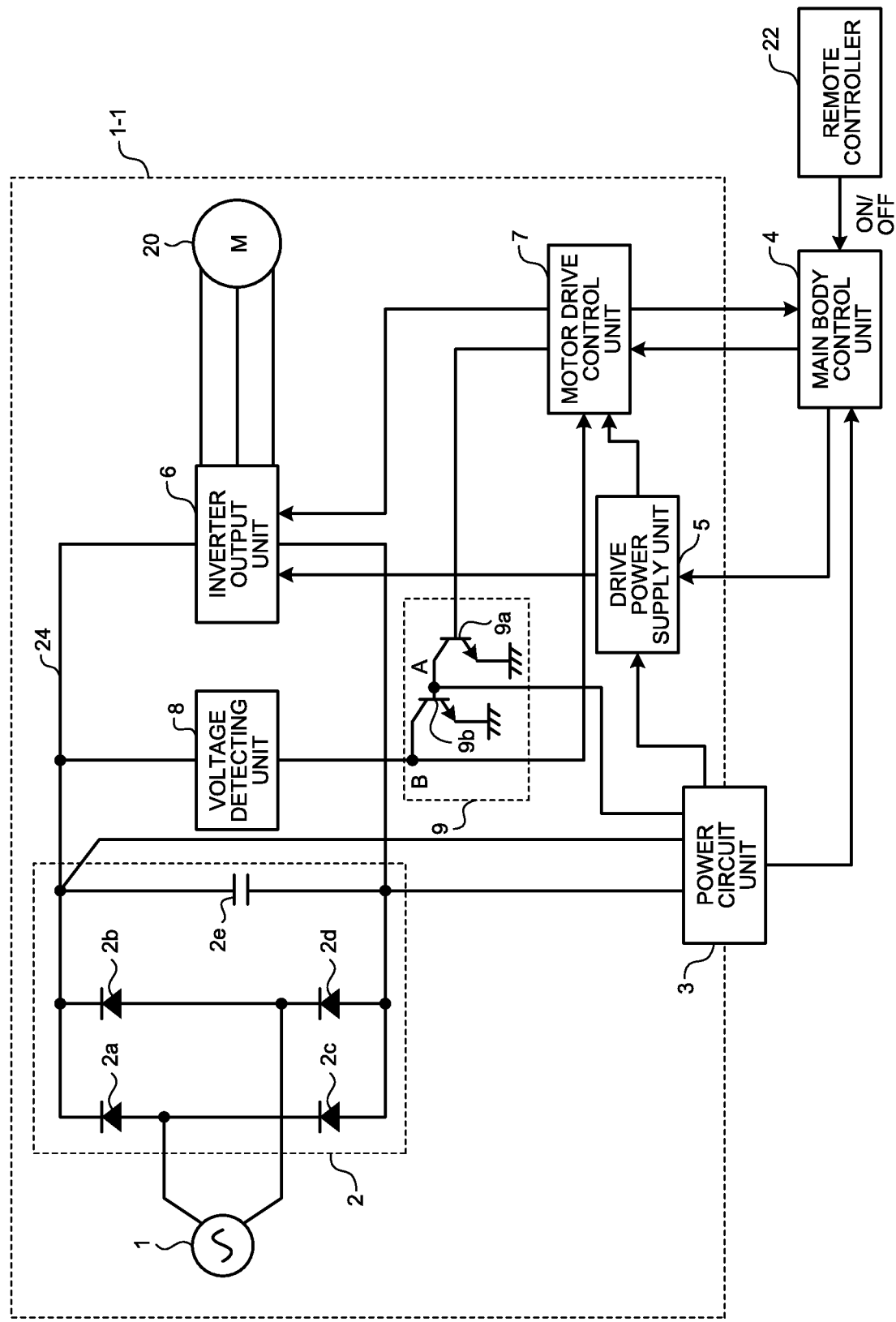
FIG. 1 is a block diagram illustrating an example of an electrical system in an air conditioner according to a first embodiment.

FIG. 1 is a block diagram illustrating an example of an electrical system in an air conditioner according to a first embodiment. In FIG. 1, the air conditioner according to the first embodiment includes a power generating unit 2, a power circuit unit 3, a main body control unit 4, a drive power supply unit 5, an inverter output unit 6, a motor drive control unit 7, a voltage detecting unit 8, an input changeover switch 9, a motor 20, and a remote controller 22. Among the components constituting the air conditioner, the components other than the remote controller 22 define the body of the air conditioner, and the remote controller 22 is a controller that gives instructions to the body of the air conditioner. As illustrated in the drawings, the air conditioner according to the first embodiment is configured to drive the motor 20 upon receiving the supply of AC power supplied from a commercial power source 1. In the air conditioner, the motor 20 is used for at least one or more motors (for example, a motor for a compressor and a motor for blowing air) included in the air conditioner.

In FIG. 1, assuming that the air conditioner has a primary side defined as being electrically connected to the commercial power source 1, a broken line 1-1 indicates a boundary between the primary side and a secondary side of the air conditioner on which the main body control unit 4 is provided, when the primary side is insulated from the secondary side. The air conditioner configured to have the secondary side insulated from the primary side (hereinafter referred to as an "insulated configuration" of the air conditioner) will be described later.

The power generating unit 2 includes bridge-connected diodes 2a to 2d and a smoothing capacitor 2e. A DC voltage resulting from the conversion by the diodes 2a to 2d is applied to the smoothing capacitor. The power generating unit 2 converts an AC voltage applied from the commercial power source 1 into a DC voltage to generate drive power for driving the air conditioner. The inverter output unit 6 drives the motor 20 by using power supplied from the power generating unit 2. The voltage detecting unit 8 detects the voltage at a DC bus 24 electrically connecting the power generating unit 2 and the inverter output unit 6, that is, a DC voltage applied to the inverter output unit 6 by the power generating unit 2. The motor drive control unit 7 controls the inverter output unit 6 on the basis of the detection result from the voltage detecting unit 8. In FIG. 1, the smoothing capacitor 2e is illustrated as a component of the power generating unit 2, but the smoothing capacitor 2e may be provided outside the power generating unit 2.

The power circuit unit 3 generates operating power by using power generated by the power generating unit 2, and supplies the generated operating power to each of the main body control unit 4 and the drive power supply unit 5. The drive power supply unit 5 supplies operating power to each of the inverter output unit 6 and the motor drive control unit 7 by using the power supplied from the power circuit unit 3. The main body control unit 4 is configured to be capable of outputting a power-on command or a power-off command to the drive power supply unit 5. The main body control unit 4 is also configured to be capable of transmitting and receiving signals to and from the motor drive control unit 7.

As described above, the voltage detecting unit 8 is configured to be capable of detecting the DC voltage applied from the power generating unit 2 to the inverter output unit 6 to input the detection result, that is, information on the detected DC voltage, to the motor drive control unit 7. In addition, the input changeover switch 9 is provided between the voltage detecting unit 8 and the motor drive control unit 7. The input changeover switch 9 includes a first transistor 9a and a second transistor 9b. The first transistor 9a and the second transistor 9b are, for example, bipolar transistors as illustrated in the drawings, but may be field-effect transistors (FETs).

For the input changeover switch 9, the first transistor 9a and the second transistor 9b are Darlington-connected, and a collector (first terminal) of the first transistor 9a and a base (control terminal) of the second transistor 9b are electrically connected to each other. Emitters (second terminals) of the first transistor 9a and the second transistor 9b are grounded. A base of the first transistor 9a is electrically connected to the motor drive control unit 7. A collector of the second transistor 9b is connected to an electrical connection point between the voltage detecting unit 8 and the motor drive control unit 7. For the convenience of the following description, as illustrated in the drawings, the electrical connection point between the collector of the first transistor 9a and the base of the second transistor 9b is referred to as a connection point A, and the electrical connection point of the second transistor 9b between the voltage detecting unit 8 and the motor drive control unit 7 is referred to as a connection point B.

Figure 2:
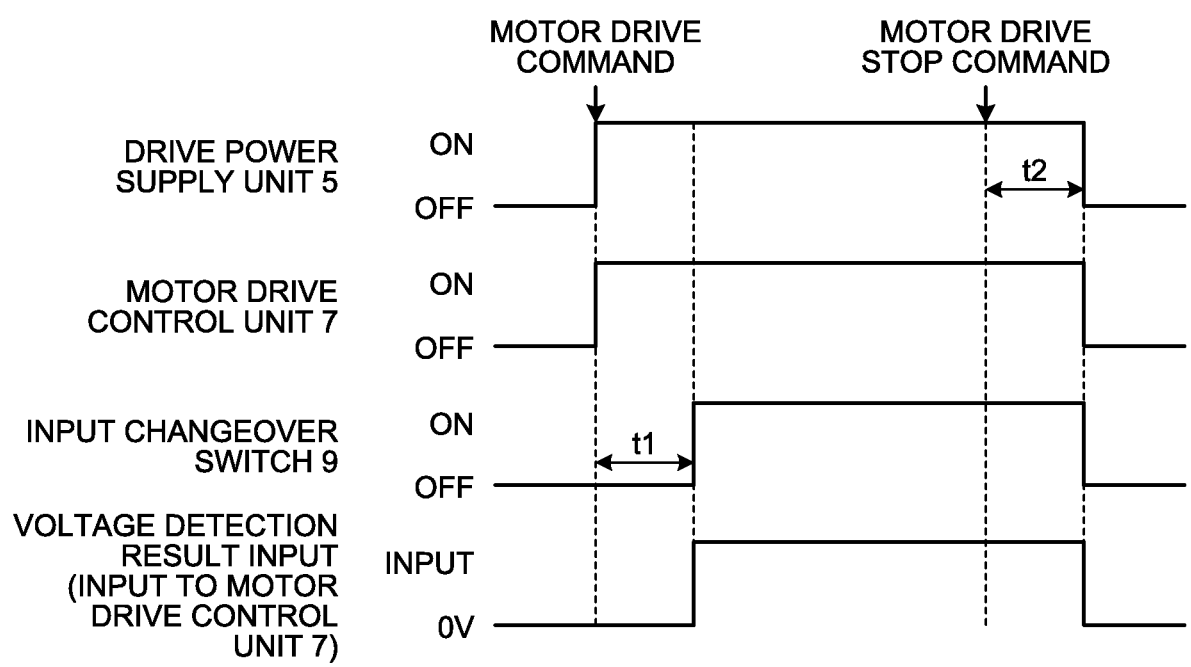
FIG. 2 is a sequence diagram of an operation of starting and stopping the air conditioner illustrated in FIG. 1.

Next, the operation of the air conditioner according to the first embodiment will be described with reference to FIGS. 1 and 2. FIG. 2 is a sequence diagram of the operation of starting and stopping the air conditioner illustrated in FIG. 1.

When the main body control unit 4 receives an input of a power-on command from the remote controller 22, the main body control unit 4 outputs a motor drive command to the drive power supply unit 5, thereby turning the drive power supply unit 5 on. Once the drive power supply unit 5 is turned on, the motor drive control unit 7 is also turned on. The input changeover switch 9 is turned on after a lapse of time t1 since the motor drive control unit 7 is turned on. The time t1 is freely-selected set time. When the input changeover switch 9 is turned on, the detection result from the voltage detecting unit 8 is input to the motor drive control unit 7.

When the main body control unit 4 receives an input of a power-off command from the remote controller 22, the main body control unit 4 outputs a motor drive stop command to the drive power supply unit 5. After the lapse of time t2, the drive power supply unit 5 is turned off, and then the motor drive control unit 7 and the input changeover switch 9 are sequentially turned off. The time t2 is freely-selected set time. In response to the input changeover switch 9 being turned off, the input of the detection result from the voltage detecting unit 8 to the motor drive control unit 7 is cut off.

Next, the operation of the input changeover switch 9 will be described. When the motor drive control unit 7 is in the off state, no signal is output from the motor drive control unit 7 to the input changeover switch 9. At this time, the first transistor 9a of the input changeover switch 9 is in an off state and the potential at the connection point A is at a "high" level. Thus, the second transistor 9b is in an on state and the potential at the connection point B is at a "low" level (approximately at the GND potential level, that is, 0 V). Therefore, the detection result from the voltage detecting unit 8 is not input to the motor drive control unit 7 as the motor drive control unit 7 is in the off state.

On the other hand, when the motor drive control unit 7 is turned on, the motor drive control unit 7 outputs a signal to the input changeover switch 9, thereby turning the first transistor 9a of the input changeover switch 9 on. Once the first transistor 9a is turned on, the potential at the connection point A becomes a "low" level, and the second transistor 9b is turned off accordingly. Since the potential at the connection point B rises in response to the second transistor 9b being turned off, the detection result from the voltage detecting unit 8 is input to the motor drive control unit 7.

As described above, the input changeover switch 9 switches between the function of inputting the detection result from the voltage detecting unit 8 to the motor drive control unit 7 and the function of forcibly lowering the potential to the GND potential level. This switching function of the switch 9 is equivalent to a detection result inhibiting circuit 14 described in a second embodiment.

A microcomputer is generally used as the main body control unit 4 and the motor drive control unit 7. If the air conditioner of FIG. 1 does not include the input changeover switch 9, the detection result from the voltage detecting unit 8 is undesirably input to the motor drive control unit 7 regardless of whether the motor drive control unit 7 is in the on or off state. The input of some voltage to an input port (not illustrated) of the motor drive control unit 7 in the off state is called a reverse bias, which is not favorable for the motor drive control unit 7 that is a microcomputer. Where the air conditioner includes the input changeover switch 9, on the other hand, as in the above-described operation, the input changeover switch operates, as described above, to prevent the detection result from the voltage detecting unit 8 from being input to the motor drive control unit 7 when the motor drive control unit 7 is in the off state. Therefore, even when the drive power supply unit 5 is turned off for the reduction of power consumption, the input changeover switch 9 can prevent the motor drive control unit 7 from being subjected to the reverse bias.

Note that the sequence illustrated in FIG. 2 is only an example, and the input changeover switch 9 may be turned on at the time the motor drive control unit 7 is turned on. The input changeover switch 9 may be turned off once the drive power supply unit 5 receives the motor drive stop command. At this time, the motor drive control unit 7 itself may be turned off at the time the drive power supply unit 5 receives the motor drive stop command. In other words, the lapse time t1 since the reception of the motor drive command and the lapse time t2 since the reception of the motor drive stop command may include zero seconds.

Figure 3:
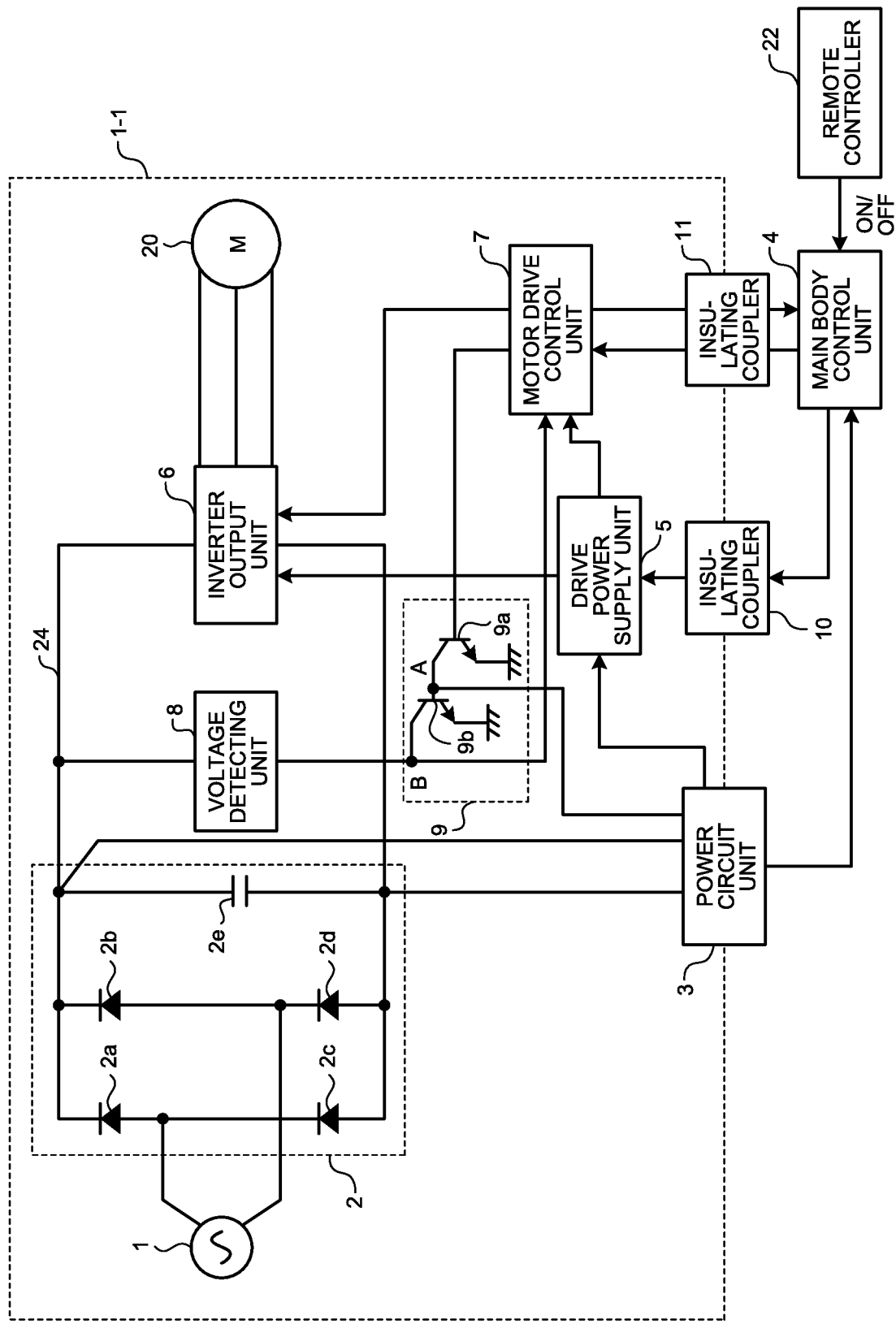
FIG. 3 is a block diagram illustrating an example of the air conditioner illustrated in FIG. 1 as the air conditioner is modified into an insulated configuration.

FIG. 3 is a block diagram illustrating an example of the air conditioner illustrated in FIG. 1 as the air conditioner is modified into the insulated configuration. The insulated configuration means a configuration that electrically insulates the main body control unit 4 from the components arranged within the broken line 1-1, in other words, a configuration that disconnects the circuitry of the main body control unit 4 from the circuitry of the components within the broken line 1-1. As illustrated in FIG. 3, the insulation of the main body control unit 4 can be achieved by inserting an insulating coupler 10 between the main body control unit 4 and the drive power supply unit 5 and an insulating coupler 11 between the main body control unit 4 and the motor drive control unit 7. FIGS. 1 and 3 illustrate the power circuit unit 3 on the boundary, i.e, the broken line 1-1, which means that the power circuit unit 3 itself is an insulated power source in which the primary side and the secondary side are insulated from each other by means of an insulating transformer, for example. The power circuit unit 3 is, for example, a flyback converter.

The air conditioner of FIG. 3 differs from the air conditioner of FIG. 1 in that the air conditioner of FIG. 3 includes the insulating couplers 10 and 11 while the air conditioner of FIG. 1 does not include the insulating couplers 10, 11. The air conditioner of FIG. 3 is the same in the operation sequence itself as the air conditioner of FIG. 1, and thus, the description of the operation of the air conditioner illustrated in FIG. 3 is omitted.

Figure 4:
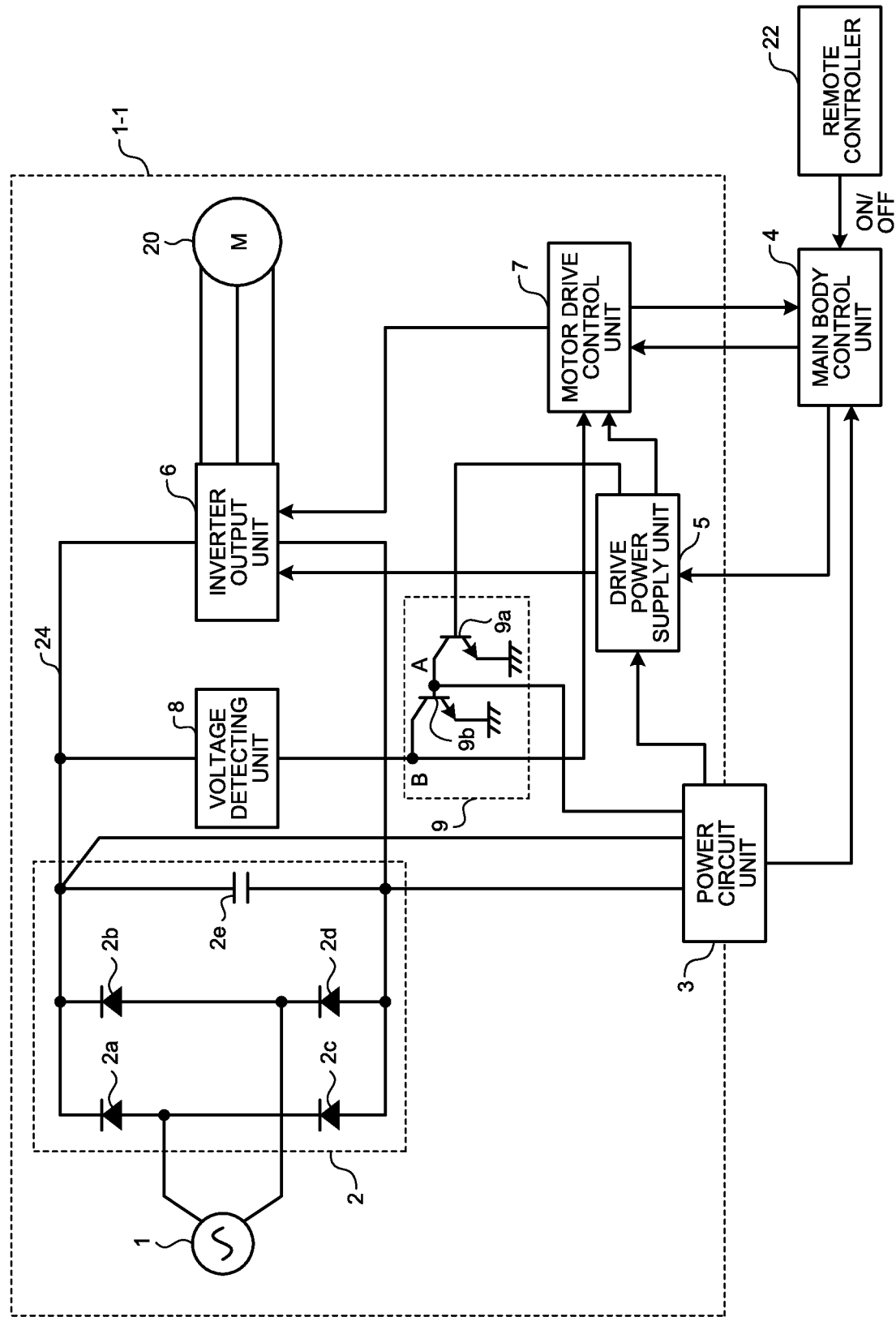
FIG. 4 is a block diagram illustrating an example of the electrical system in the air conditioner according to the first embodiment, which electrical system is different from that of FIG. 1.
Figure 5:
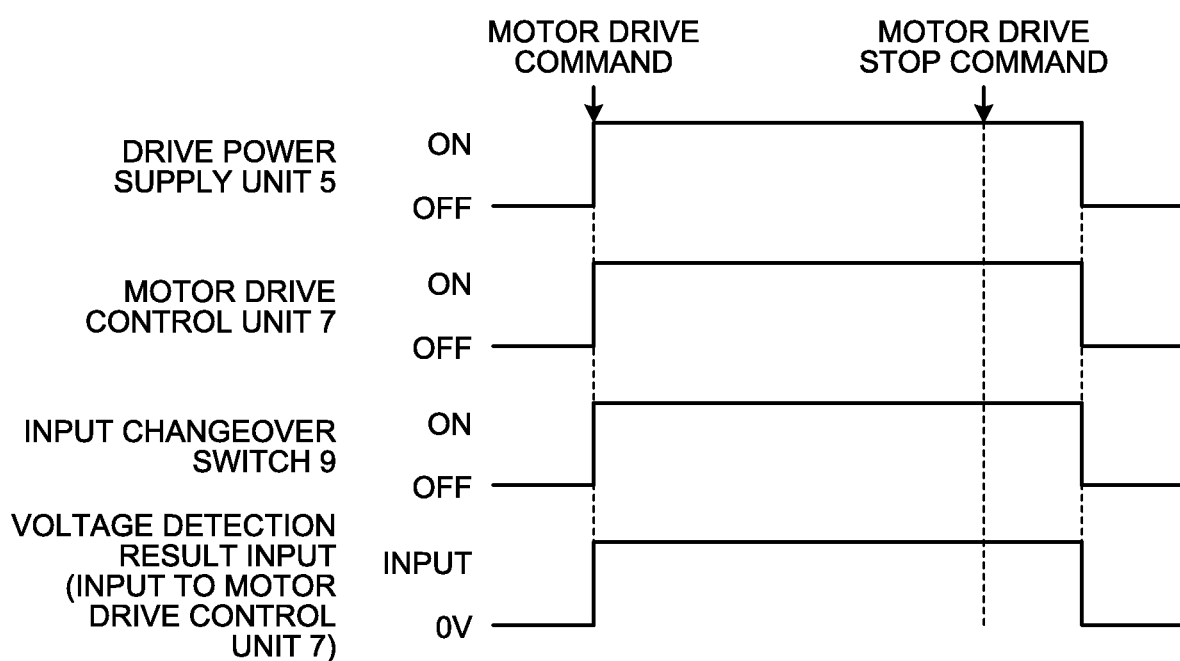
FIG. 5 is a sequence diagram of an operation of starting the air conditioner illustrated in FIG. 4.

FIG. 4 is a block diagram illustrating an example of the electrical system in the air conditioner according to the first embodiment, which electrical system is different from that of FIG. 1. FIG. 5 is a sequence diagram of the operation of starting the air conditioner illustrated in FIG. 4. Although the input changeover switch 9 of FIG. 1 is configured to be controlled by the motor drive control unit 7, the input changeover switch 9 may be configured to be controlled by the drive power supply unit 5, as illustrated in FIG. 4.

The configuration of FIG. 4 provides the sequence as illustrated in FIG. 5 when receiving the motor drive command and the motor drive stop command. Specifically, as the drive power supply unit 5 is turned on or off, the operation of the motor drive control unit 7, the operation of the input changeover switch 9, and the operation of inputting the voltage detection result to the motor drive control unit 7 occur in conjunction with one another. These operations allow the input changeover switch 9 to prevent the motor drive control unit 7 from being subjected to the reverse bias, even when the drive power supply unit 5 is turned off in order to reduce power consumption.

Figure 6:
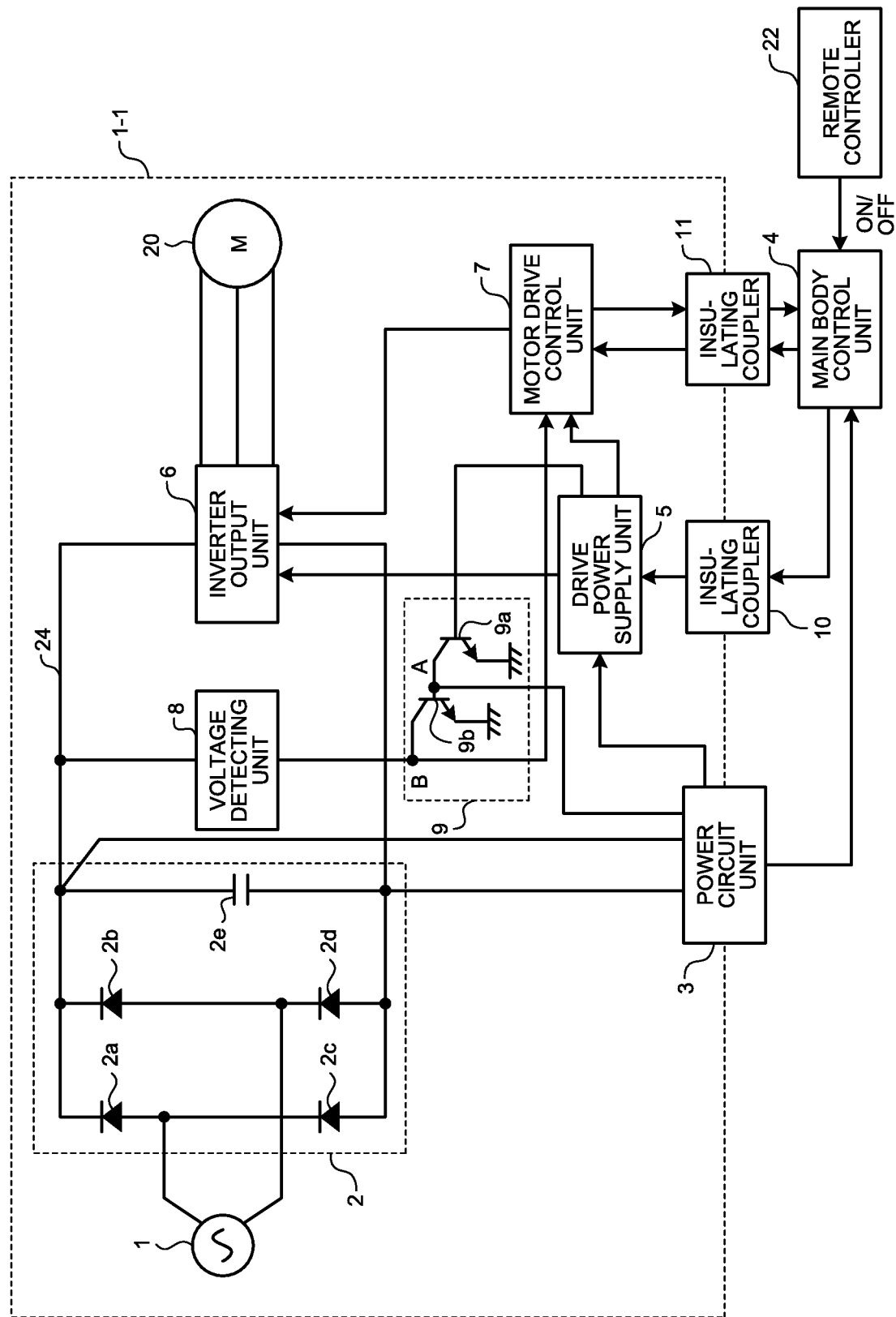
FIG. 6 is a block diagram illustrating an example of the air conditioner illustrated in FIG. 4 as the air conditioner is modified into an insulated configuration.

FIG. 6 is a block diagram illustrating an example of the air conditioner illustrated in FIG. 4 as the air conditioner is modified into the insulated configuration. As in FIG. 3, the insulated configuration can be achieved by inserting the insulating coupler 10 between the main body control unit 4 and the drive power supply unit 5 and the insulating coupler 11 between the main body control unit 4 and the motor drive control unit 7.

The air conditioner of FIG. 6 differs from the air conditioner of FIG. 4 in that the air conditioner of FIG. 6 includes the insulating couplers 10 and 11 while the air conditioner of FIG. 4 does not include the insulating couplers 10, 11. The air conditioner of FIG. 6 has the same operation sequence as that of the air conditioner of FIG. 4, and thus, the description of the operation of the air conditioner illustrated in FIG. 6 is omitted.

Figure 7:
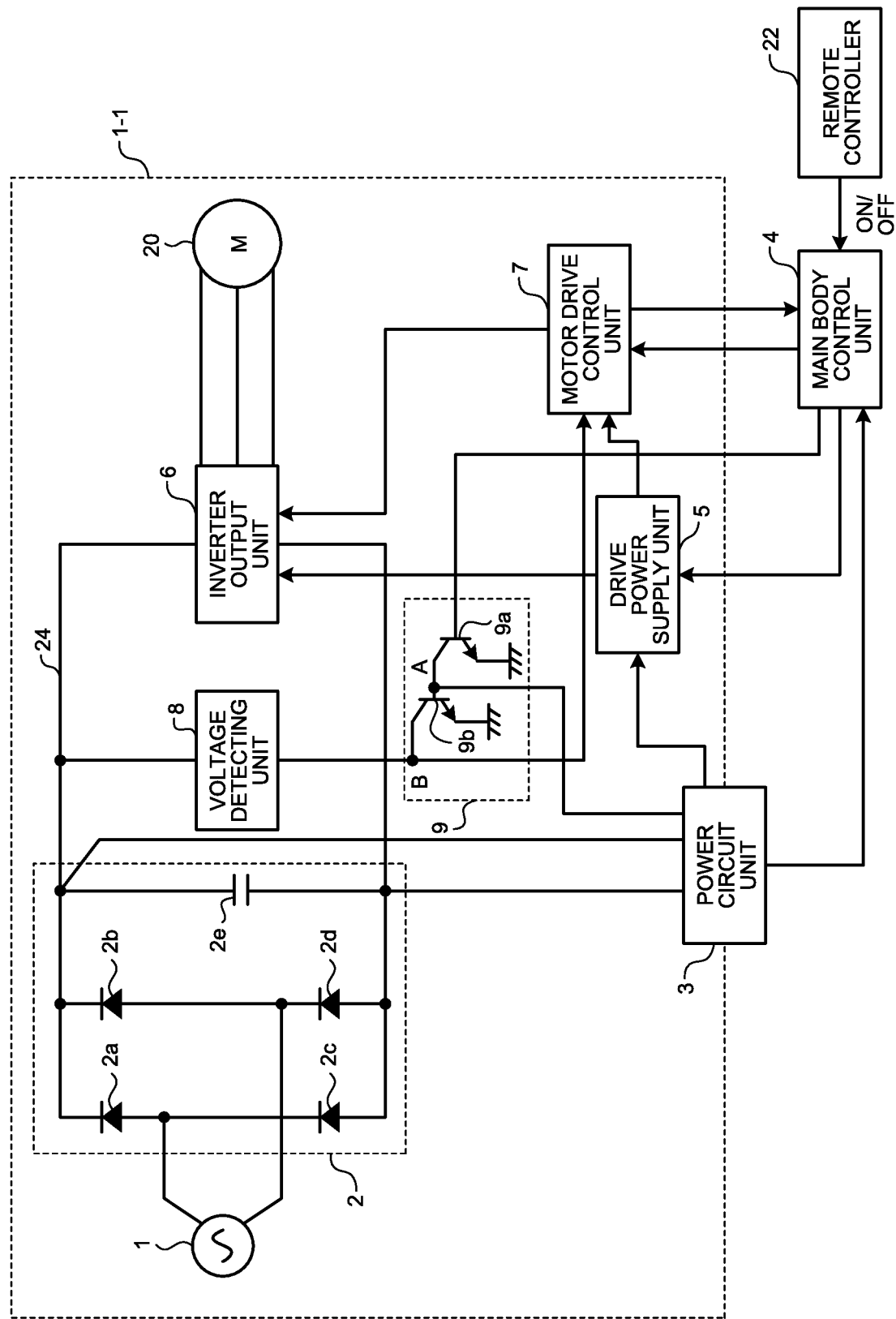
FIG. 7 is a block diagram illustrating an example of the electrical system in the air conditioner according to the first embodiment, which electrical system is different from those of FIGS. 1 and 4.

FIG. 7 is a block diagram illustrating an example of the electrical system in the air conditioner according to the first embodiment, which electrical system is different from those of FIGS. 1 and 4. Although the input changeover switch 9 of FIG. 1 is configured to be controlled by the motor drive control unit 7 and the input changeover switch 9 of FIG. 4 is configured to be controlled by the drive power supply unit 5, the input changeover switch 9 may be configured to be controlled by the main body control unit 4 as illustrated in FIG. 7.

The air conditioner of FIG. 7 differs from the air conditioners of FIGS. 1 and 4 only in the source of output of the control signal that is to be input to the input changeover switch 9. Therefore, any element of the sequence of the operation of the air conditioner is not changed, and the operation is similar to the sequential operation illustrated in FIG. 2 or 5.

Figure 8:
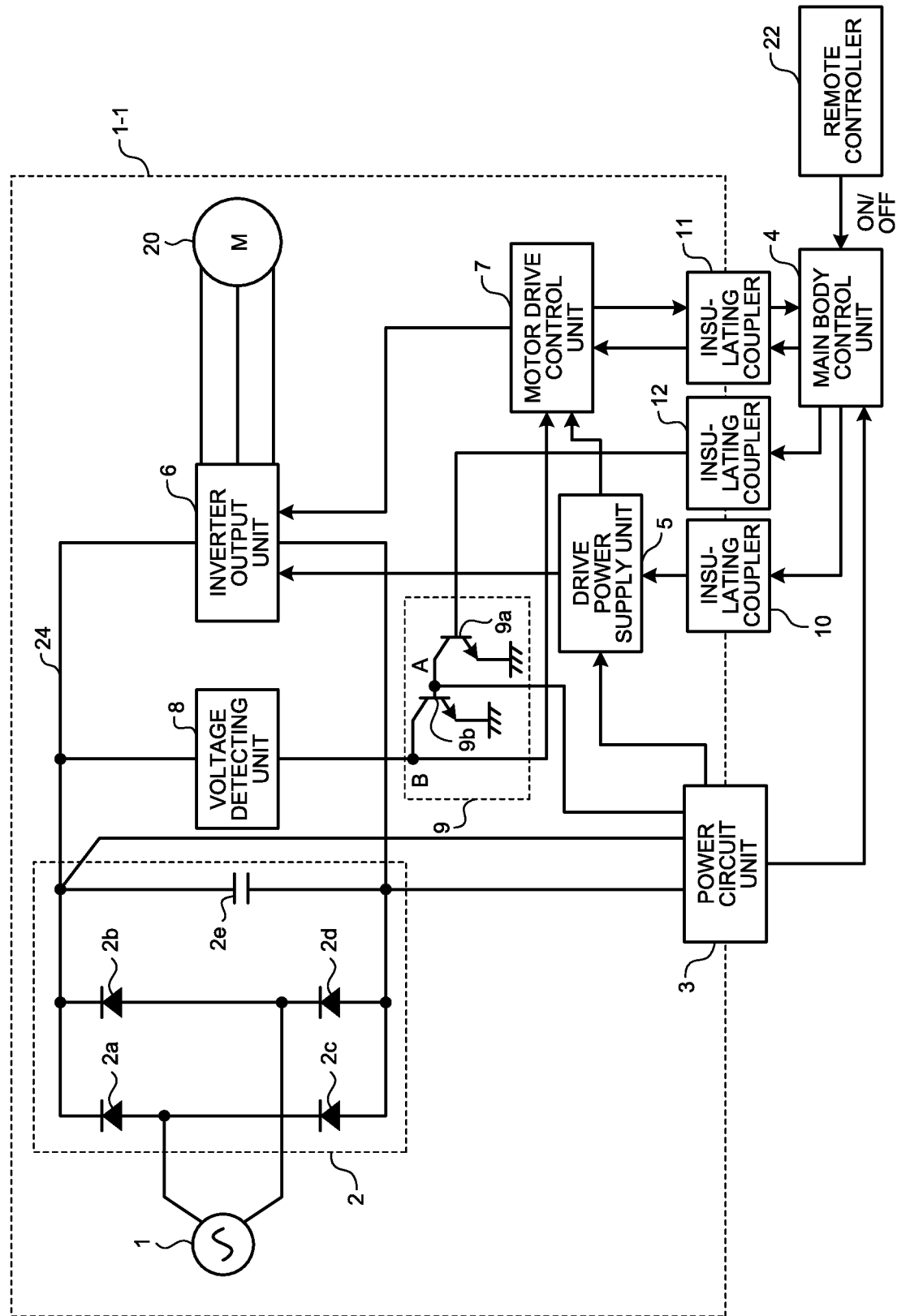
FIG. 8 is a block diagram illustrating an example of the air conditioner illustrated in FIG. 7 as the air conditioner is modified into an insulated configuration.

FIG. 8 is a block diagram illustrating an example of the air conditioner illustrated in FIG. 7 as the air conditioner is modified into the insulated configuration. In FIG. 8, the insulated configuration is achieved by inserting an insulating coupler 10 between the main body control unit 4 and the drive power supply unit 5, an insulating coupler 11 between the main body control unit 4 and the motor drive control unit 7, and an insulating coupler 12 between the main body control unit 4 and the input changeover switch 9.

The air conditioner of FIG. 8 differs from the air conditioner of FIG. 7 in that the air conditioner of FIG. 8 includes the insulating couplers 10 to 12 while the air conditioner of FIG. 7 does not include the insulating couplers 10 to 12. The air conditioner of FIG. 8 is the same in the operation sequence itself as the air conditioner of FIG. 7, and thus, the description of the operation of the air conditioner illustrated in FIG. 8 is omitted.

As described above, according to the air conditioner of the first embodiment, the input changeover switch operates such that the detection result from the voltage detecting unit is input to the motor drive control unit as the motor is driven, and the input of the detection result to the motor drive control unit is cut off as the motor stops being driven. It is thus possible to suppress the increase in device scale and increase in cost, and reduce power consumption as the motor stops being driven.

In addition, according to the air conditioner of the first embodiment, the first transistor of the input changeover switch is in the off state and the second transistor of the input changeover switch is in the on state as the motor drive control unit is not in operation, whereby the input of the detection result from the voltage detecting unit to the motor drive control unit is cut off. It is thus possible to reliably prevent the motor drive control unit from being subjected to the reverse bias.

In addition, according to the air conditioner of the first embodiment, the first transistor of the input changeover switch is in the off state and the second transistor of the input changeover switch is in the on state as the drive power supply unit is not in operation, whereby the input of the detection result of the voltage detecting unit to the motor drive control unit is cut off. It is thus possible to reliably prevent the motor drive control unit from being subjected to the reverse bias.

In addition, according to the air conditioner of the first embodiment, the first transistor of the input changeover switch is in the off state and the second transistor of the input changeover switch is in the on state as the main body control unit is not in operation, whereby the input of the detection result from the voltage detecting unit to the motor drive control unit is cut off. It is thus possible to reliably prevent the motor drive control unit from being subjected to the reverse bias.

Second Embodiment

Figure 9:
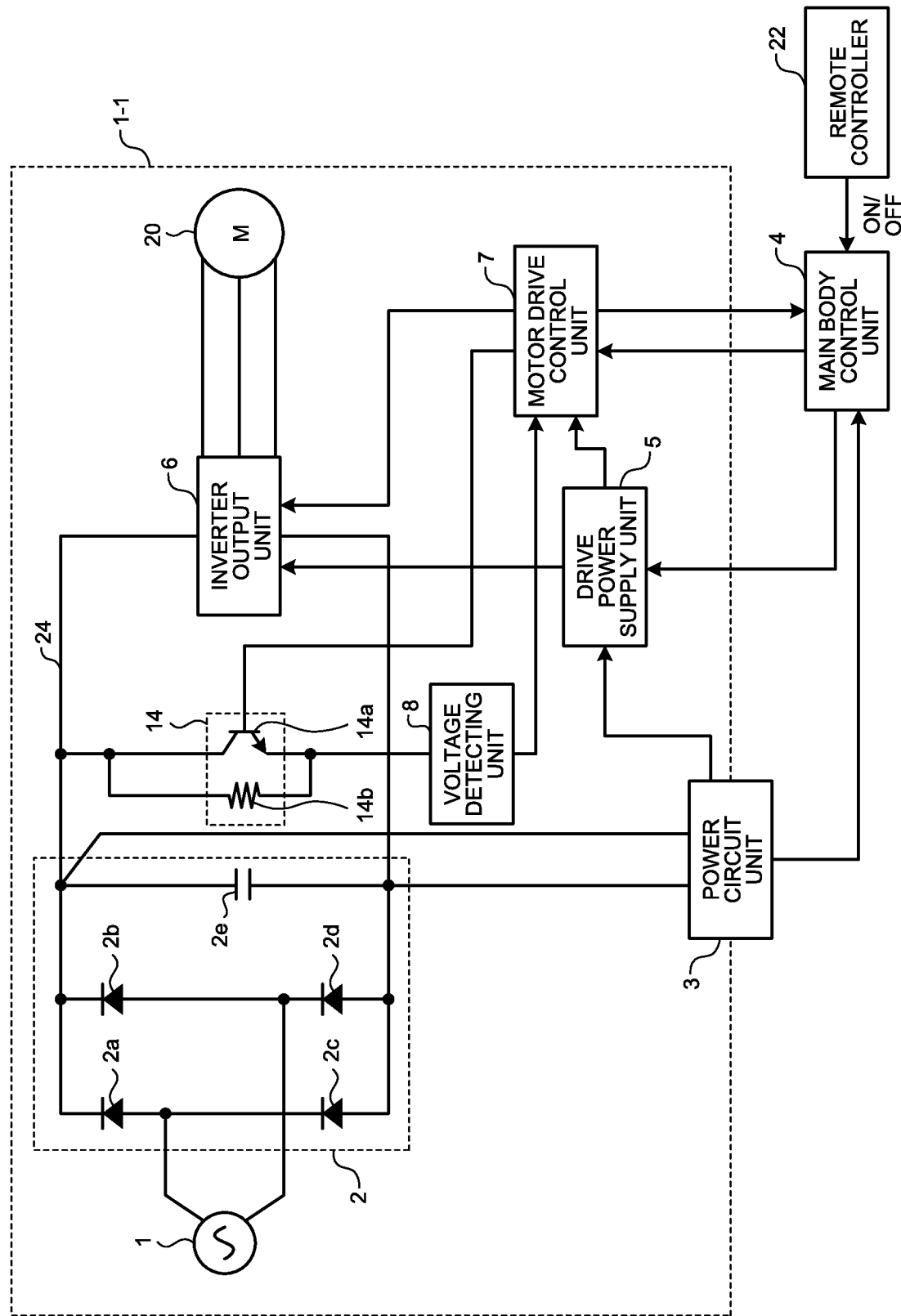
FIG. 9 is a block diagram illustrating an example of an electrical system in an air conditioner according to a second embodiment.

FIG. 9 is a block diagram illustrating an example of an electrical system in an air conditioner according to a second embodiment. The configuration of FIG. 9 is different from the configuration of the first embodiment illustrated in FIG. 1 in that instead of the input changeover switch 9, the detection result inhibiting circuit 14 is inserted between the DC bus 24 and the voltage detecting unit 8. The detection result inhibiting circuit 14 includes a current changeover switch 14a and a current limiting resistor 14b connected in parallel to the current changeover switch 14a. It is to be noted that the other configuration is the same as or equivalent to the configuration of the first embodiment illustrated in FIG. 1. The same or equivalent components are denoted by the same reference signs, and the redundant description is omitted.

Figure 10:
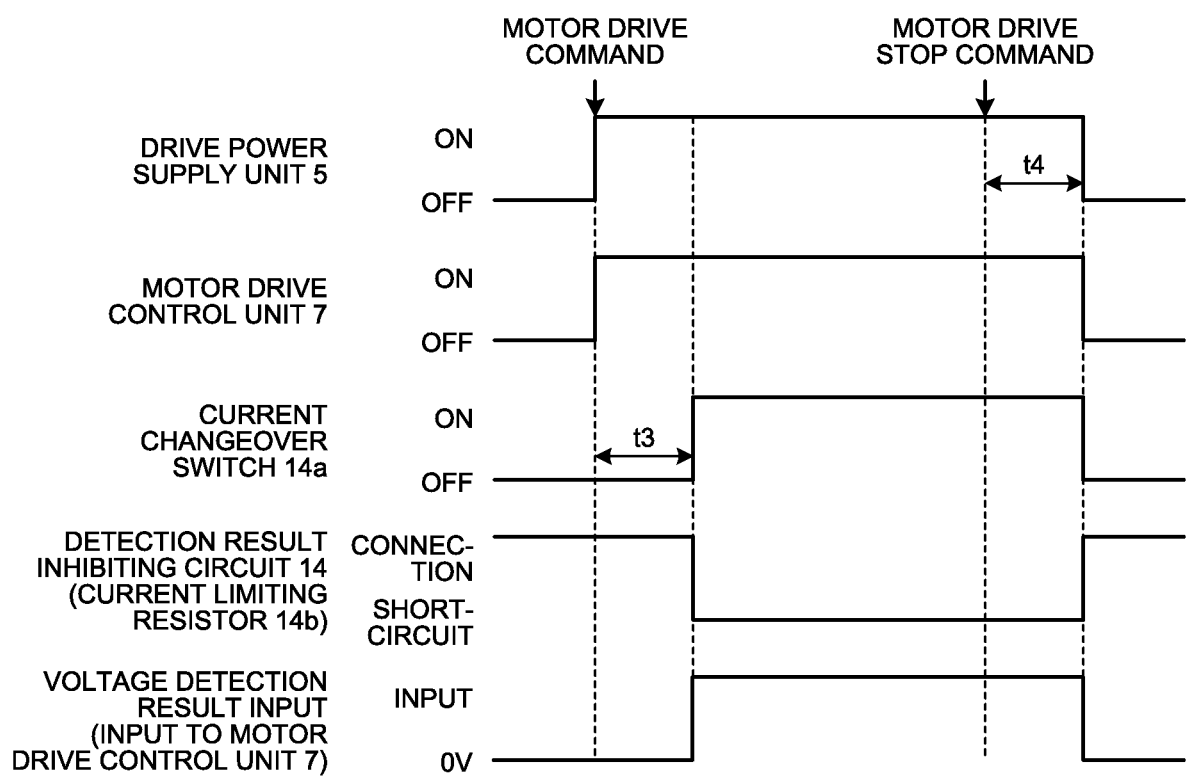
FIG. 10 is a sequence diagram of an operation of starting and stopping the air conditioner illustrated in FIG. 9.

Next, the operation of the air conditioner according to the second embodiment will be described with reference to FIGS. 9 and 10. FIG. 10 is a sequence diagram of the operation of starting and stopping the air conditioner illustrated in FIG. 9.

When the main body control unit 4 receives an input of a power-on command from the remote controller 22, the main body control unit 4 outputs a motor drive command to the drive power supply unit 5, thereby turning the drive power supply unit 5 on. Once the drive power supply unit 5 is turned on, the motor drive control unit 7 is also turned on. The current changeover switch 14a is turned on after a lapse of time t3 since the motor drive control unit 7 is turned on. The time t3 is freely-selected set time. The DC bus 24 and the voltage detecting unit 8 are connected to each other via the current limiting resistor 14b as the current changeover switch 14a is in the off state. Once the current changeover switch 14a is turned on, the DC bus 24 and the voltage detecting unit 8 are connected to each other without the current limiting resistor 14b being interposed therebetween. That is, the detection result inhibiting circuit 14 shifts from a connection state that allows the DC bus 24 and the voltage detecting unit 8 to be connected to each other via the current limiting resistor 14b, to a short-circuit state that allows the DC bus 24 and the voltage detecting unit 8 to be connected to each other without the current limiting resistor 14b being interposed therebetween. Once the detection result inhibiting circuit 14 shifts to the short-circuit state, the voltage detecting unit 8 is enabled to detect the DC voltage applied to the inverter output unit, so that the original detection result from the voltage detecting unit 8 is input to the motor drive control unit 7.

When the main body control unit 4 receives an input of a power-off command from the remote controller 22, the main body control unit 4 outputs a motor drive stop command to the drive power supply unit 5. After the lapse of time t4, the drive power supply unit 5 is turned off, and thereafter the motor drive control unit 7 and the current changeover switch 14a are sequentially turned off. The time t4 is freely-selected set time. The voltage detected by the voltage detecting unit 8 as the current changeover switch 14a is in the off state is not the original DC voltage applied to the inverter output unit 6 but a voltage obtained by subtracting the voltage drop at the current limiting resistor 14b. If the resistance value of the current limiting resistor 14b is larger than the resistance value of a resistor provided inside the voltage detecting unit 8, the detection voltage of the voltage detecting unit 8 can be reduced. As a result, the input of the detection result from the voltage detecting unit 8 to the motor drive control unit 7 is substantially cut off, thereby preventing the motor drive control unit 7 from being subjected to the reverse bias.

Note that the sequence in FIG. 10 is only an example, and the current changeover switch 14a may be turned on at the time the motor drive control unit 7 is turned on. The current changeover switch 14a may be turned off once the drive power supply unit 5 receives the motor drive stop command. At this time, the motor drive control unit 7 itself may be turned off at the time the drive power supply unit 5 receives the motor drive stop command. In other words, the lapse time t3 since the reception of the motor drive command and the lapse time t4 since the reception of the motor drive stop command may include zero seconds.

Figure 11:
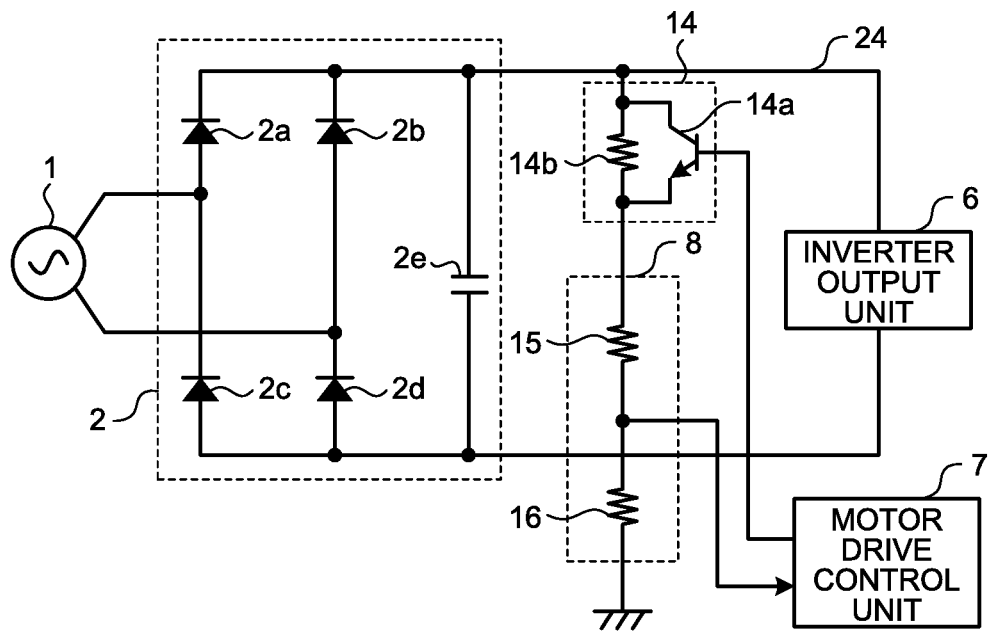
FIG. 11 is a block diagram illustrating an example of a voltage detecting unit together with partial circuit elements of FIG. 9.

Next, the operation of the voltage detecting unit 8 will be described with reference to FIG. 11. FIG. 11 is a block diagram illustrating an example of the voltage detecting unit 8 together with partial circuit elements of FIG. 9. In the configuration of FIG. 11, a resistor 15 and a resistor 16 are connected in series within the voltage detecting unit 8, and a divided voltage provided by the resistor 15 and the resistor 16 is input to the motor drive control unit 7.

Once the current changeover switch 14a short-circuits the opposite ends of the current limiting resistor 14b at the time the motor is driven, the DC voltage generated by the power generating unit 2 is divided by the resistors 15 and 16. The voltage detecting unit 8 inputs the divided voltage provided by the resistors 15 and 16 to the motor drive control unit 7 as the detection result. At this time, a current flows through the resistors 15 and 16, and, thus power consumption continuously occurs due to the resistors 15 and 16.

On the other hand, both the reduction of power consumption and the prevention of reverse bias of the motor drive control unit 7 are required as the motor stops being driven. If only the current changeover switch 14a is connected to the voltage detecting unit 8 in the configuration illustrated in FIG. 11, the current changeover switch 14a is controlled to be off as the motor stops being driven, such that no current flows through the resistors 15 and 16, thereby preventing the motor drive control unit 7 from being subjected to the reverse bias. Unfortunately, such a design to provide only the current changeover switch 14a unavoidably requires a high-voltage-resistant switch to be selected as the current changeover switch 14a because the voltage value stored in the smoothing capacitor 2e is large. The substrate on which the voltage detecting unit 8 and the current changeover switch 14a are mounted is high in cost and the mounting area is large.

In this regard, the second embodiment provides the current limiting resistor 14b connected in parallel to the opposite ends of the current changeover switch 14a, as illustrated in FIG. 11. In FIG. 11, the current limiting resistor 14b, which is connected in series to the resistors 15 and 16 constituting the voltage detecting unit 8, plays the role of suppressing the current flowing through the voltage detecting unit 8 as the motor stops being driven. Since the current limiting resistor 14b can limit the current as the motor stops being driven, it is possible to suppress the increase in power consumption in the current limiting resistor 14b and the resistors 15 and 16. Since the current limiting resistor 14b is connected in parallel to the current changeover switch 14a, the voltage applied to the opposite ends of the current changeover switch 14a is small. As a result, the selected current changeover switch 14a can be a low-voltage-resistant switch, unlike the case where no current limiting resistor 14b is provided. Therefore, the voltage detecting unit 8 and the current changeover switch 14a can be mounted on a compact low-cost substrate. In addition, it is possible to prevent the motor drive control unit 7 from being subjected to the reverse bias, as described above.

Figure 12:
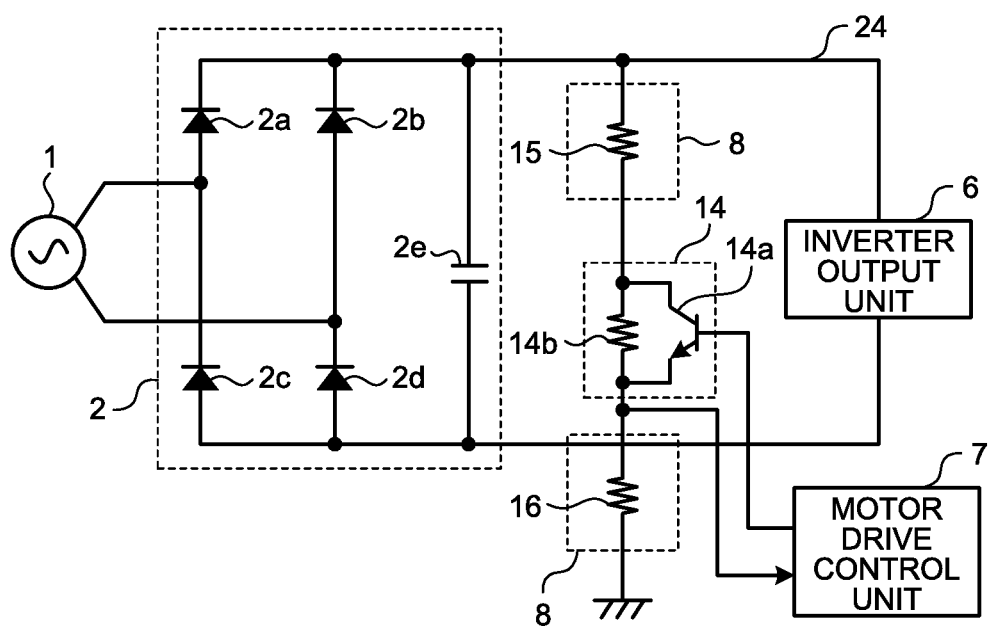
FIG. 12 is a block diagram illustrating an example of the voltage detecting unit which is different from that of FIG. 11 together with partial circuit elements of FIG. 9.

FIG. 12 is a diagram illustrating a modification to the voltage detecting unit 8, which is different from the voltage detecting unit of FIG. 11, together with the partial circuit elements of FIG. 9. Although, in FIG. 9, the detection result inhibiting circuit 14 is inserted between the DC bus 24 and the resistor 15 of the voltage detecting unit 8, one end of the resistor 15 may be connected to the DC bus 24, the detection result inhibiting circuit 14 may be inserted between the other end of the resistor 15 and one end of the resistor 16, and the voltage at one end of the resistor 16 may be input to the motor drive control unit 7 as the detected voltage. Such a configuration can also provide the same operation as discussed above in driving the motor and stopping the motor, and the same effect as that of the configuration of FIG. 11.

Figure 13:
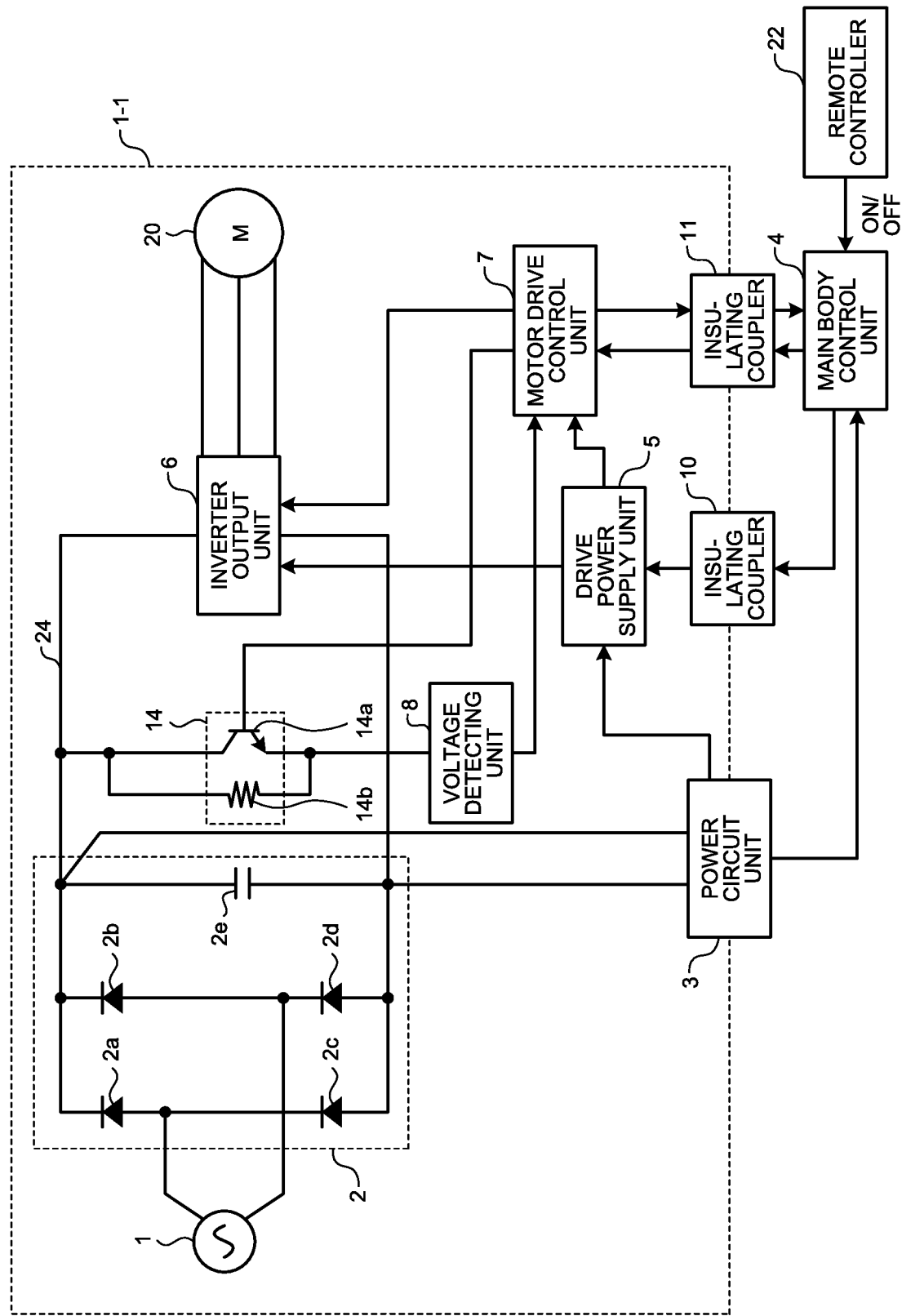
FIG. 13 is a block diagram illustrating an example of the air conditioner illustrated in FIG. 9 as the air conditioner is modified into an insulated configuration.

FIG. 13 is a block diagram illustrating an example of the air conditioner illustrated in FIG. 9 as the air conditioner is modified into the insulated configuration. As in FIG. 3, the insulated configuration can be achieved by inserting the insulating coupler 10 between the main body control unit 4 and the drive power supply unit 5 and the insulating coupler 11 between the main body control unit 4 and the motor drive control unit 7.

The air conditioner of FIG. 13 differs from the air conditioner of FIG. 9 in that the air conditioner of FIG. 13 includes the insulating couplers 10 and 11 while the air conditioner of FIG. 9 does not include the insulating couplers 10 and 11. The air conditioner of FIG. 13 has the same operation sequence as that of the air conditioner of FIG. 9, and thus the description of the operation of the air conditioner illustrated in FIG. 13 is omitted.

Figure 14:
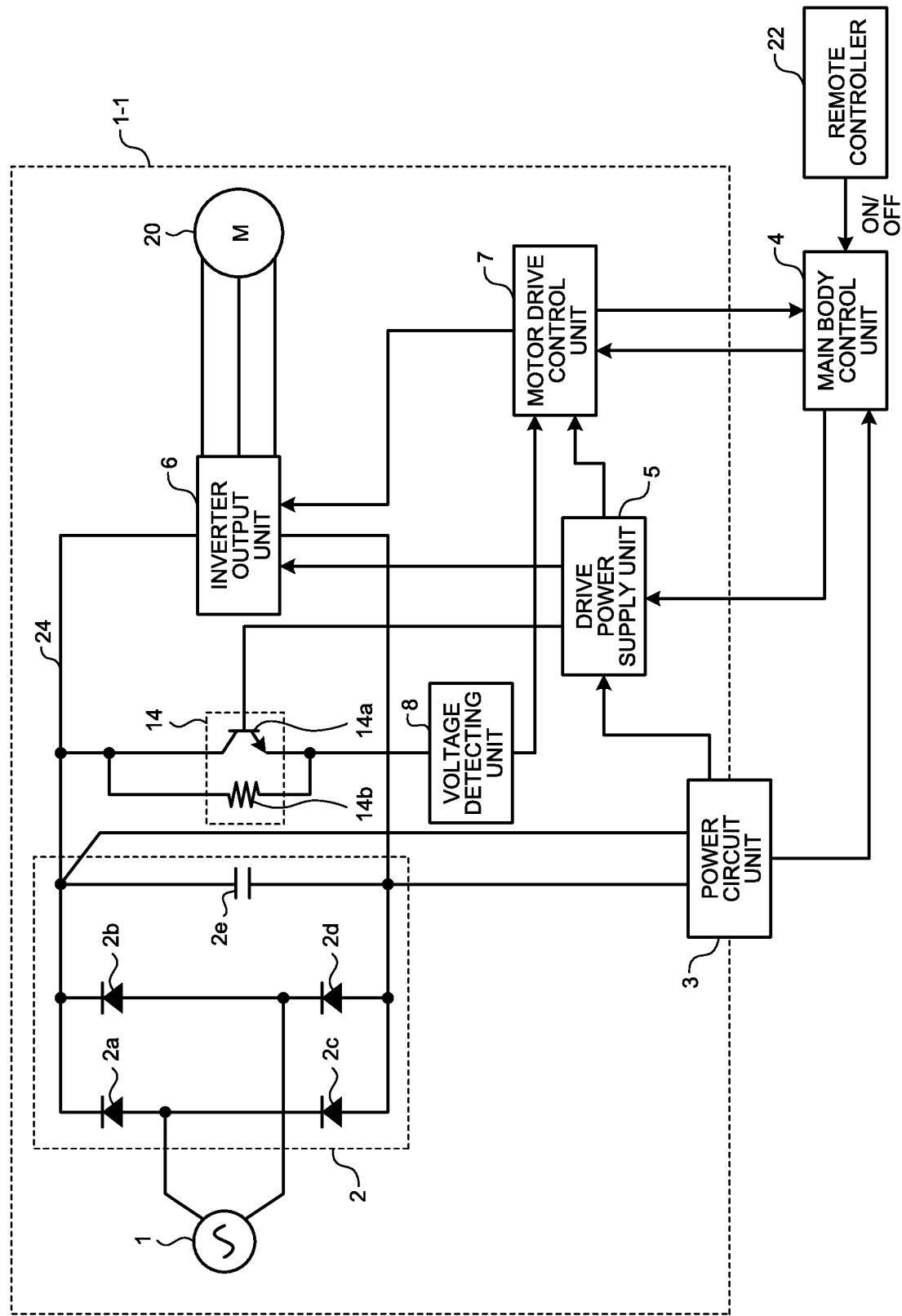
FIG. 14 is a block diagram illustrating an example of the electrical system in the air conditioner according to the second embodiment, which electrical system is different from that of FIG. 9.
Figure 15:
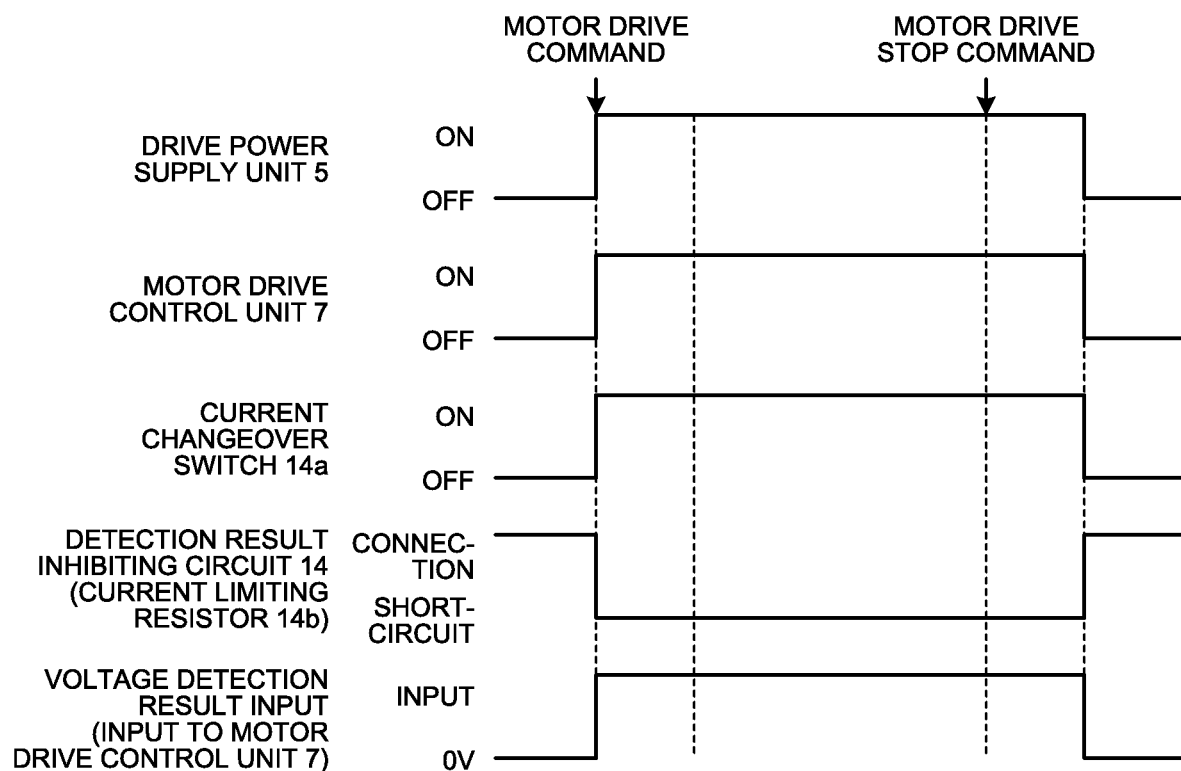
FIG. 15 is a sequence diagram of an operation of starting the air conditioner illustrated in FIG. 14.

FIG. 14 is a block diagram illustrating an example of the electrical system in the air conditioner according to the second embodiment, which electrical system is different from that of FIG. 9, and FIG. 15 is a sequence diagram of the operation of starting the air conditioner illustrated in FIG. 14. Although the detection result inhibiting circuit 14 of FIG. 9 is configured to be controlled by the motor drive control unit 7, the detection result inhibiting circuit 14 may be configured to be controlled by the drive power supply unit 5, as illustrated in FIG. 14.

The configuration of FIG. 14 provides the sequence as illustrated in FIG. 15 when receiving the motor drive command and the motor drive stop command. Specifically, as the drive power supply unit 5 is turned on or off, the operation of the motor drive control unit 7, the operation of the current changeover switch 14a, the operation of the detection result inhibiting circuit 14 (current limiting resistor 14b), and the operation of inputting the voltage detection result to the motor drive control unit 7 occur in conjunction with one another. These operations allow the detection result inhibiting circuit 14 including the current changeover switch 14a and the current limiting resistor 14b to prevent the motor drive control unit 7 from being subjected to the reverse bias, even when the drive power supply unit 5 is turned off in order to reduce power consumption.

Figure 16:
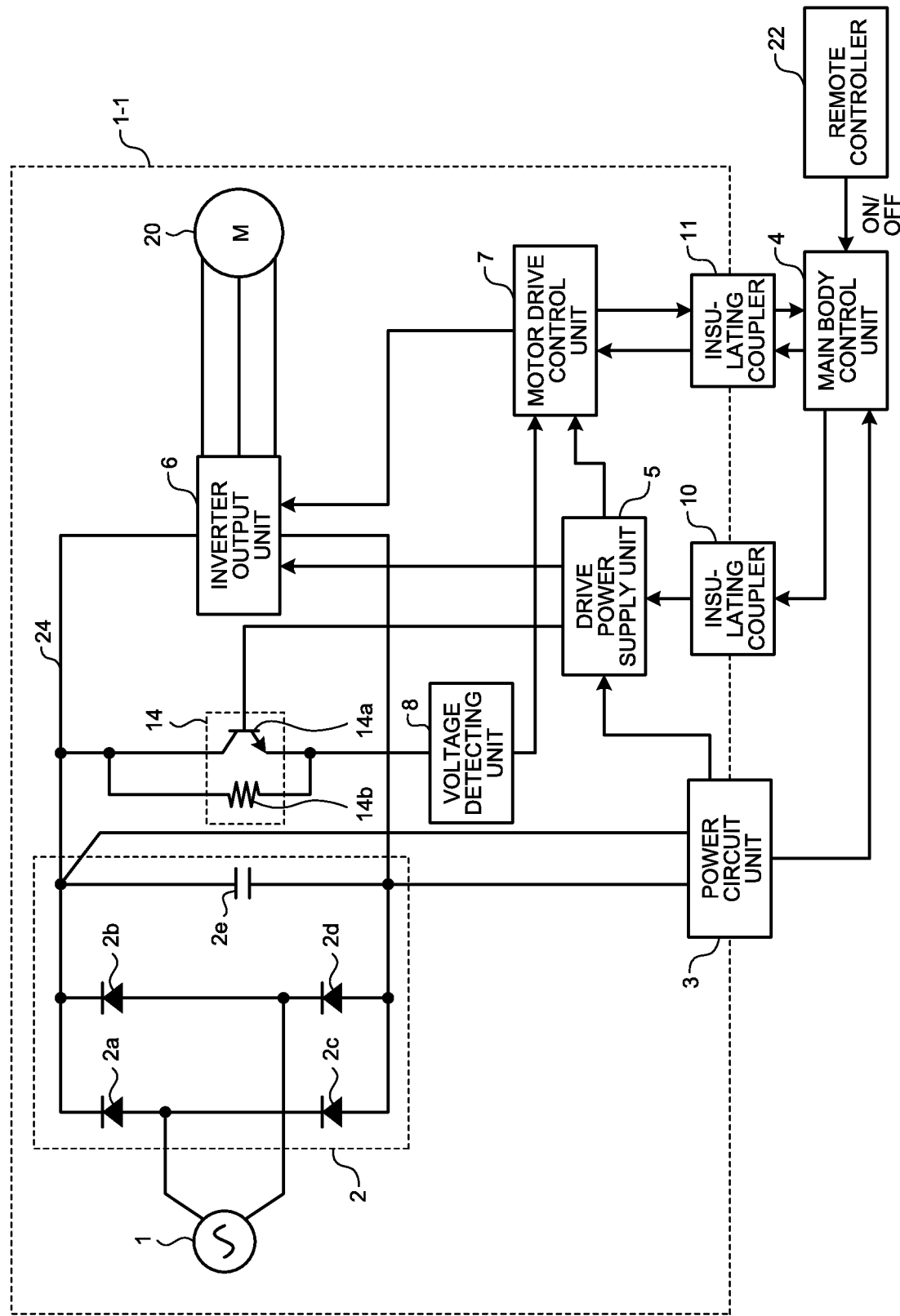
FIG. 16 is a block diagram illustrating an example of the air conditioner illustrated in FIG. 14 as the air conditioner is modified into an insulated configuration.

FIG. 16 is a block diagram illustrating an example of the air conditioner illustrated in FIG. 14 as the air conditioner is modified into the insulated configuration. As in FIG. 13, the insulated configuration can be achieved by inserting the insulating coupler 10 between the main body control unit 4 and the drive power supply unit 5 and the insulating coupler 11 between the main body control unit 4 and the motor drive control unit 7.

The air conditioner of FIG. 16 differs from the air conditioner of FIG. 14 in that the air conditioner of FIG. 16 includes the insulating couplers 10 and 11 while the conditioner of FIG. 14 does not include the insulating couplers 10 and 11. The air conditioner of FIG. 16 has the same operation sequence as that of the air conditioner of FIG. 14, and thus, the description of the operation of the air conditioner illustrated in FIG. 16 is omitted.

Figure 17:
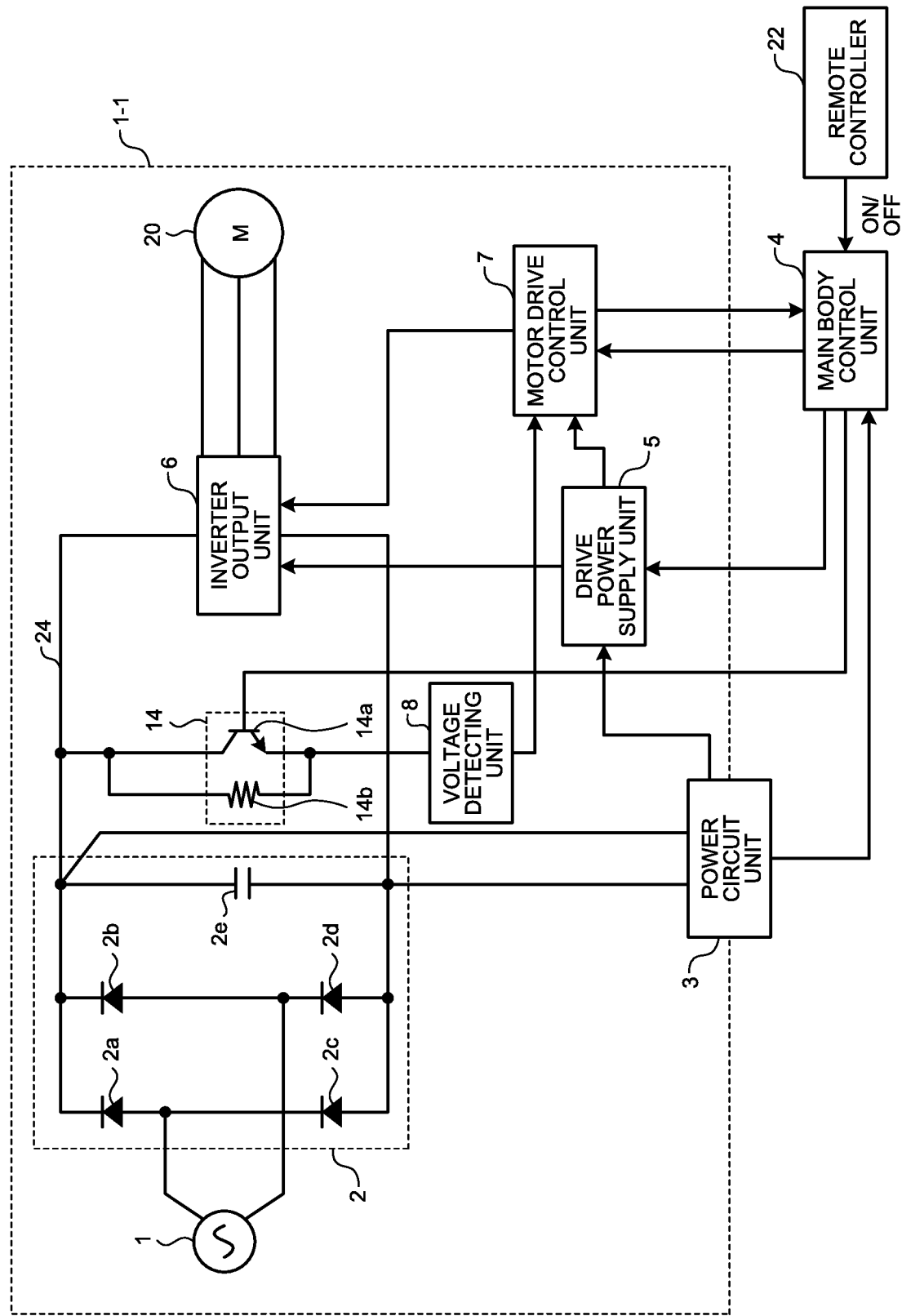
FIG. 17 is a block diagram illustrating an example of the electrical system in the air conditioner according to the second embodiment, which electrical system is different from those of FIGS. 9 and 14.

FIG. 17 is a block diagram illustrating an example of the electrical system in the air conditioner according to the second embodiment, which electrical system is different from those of FIGS. 9 and 14. Although the detection result inhibiting circuit 14 of FIG. 9 is configured to be controlled by the motor drive control unit 7 and the detection result inhibiting circuit 14 of FIG. 14 is configured to be controlled by the drive power supply unit 5, the detection result inhibiting circuit 14 may be configured to be controlled by the main body control unit 4, as illustrated in FIG. 17.

The air conditioner of FIG. 17 differs from the air conditioners of FIGS. 9 and 14 only in the source of output of the control signal that is to be input to the detection result inhibiting circuit 14. Therefore, any element of the sequence of the operation of the air conditioner is not changed, and the operation is similar to the sequential operation illustrated in FIG. 10 or 15.

Figure 18:
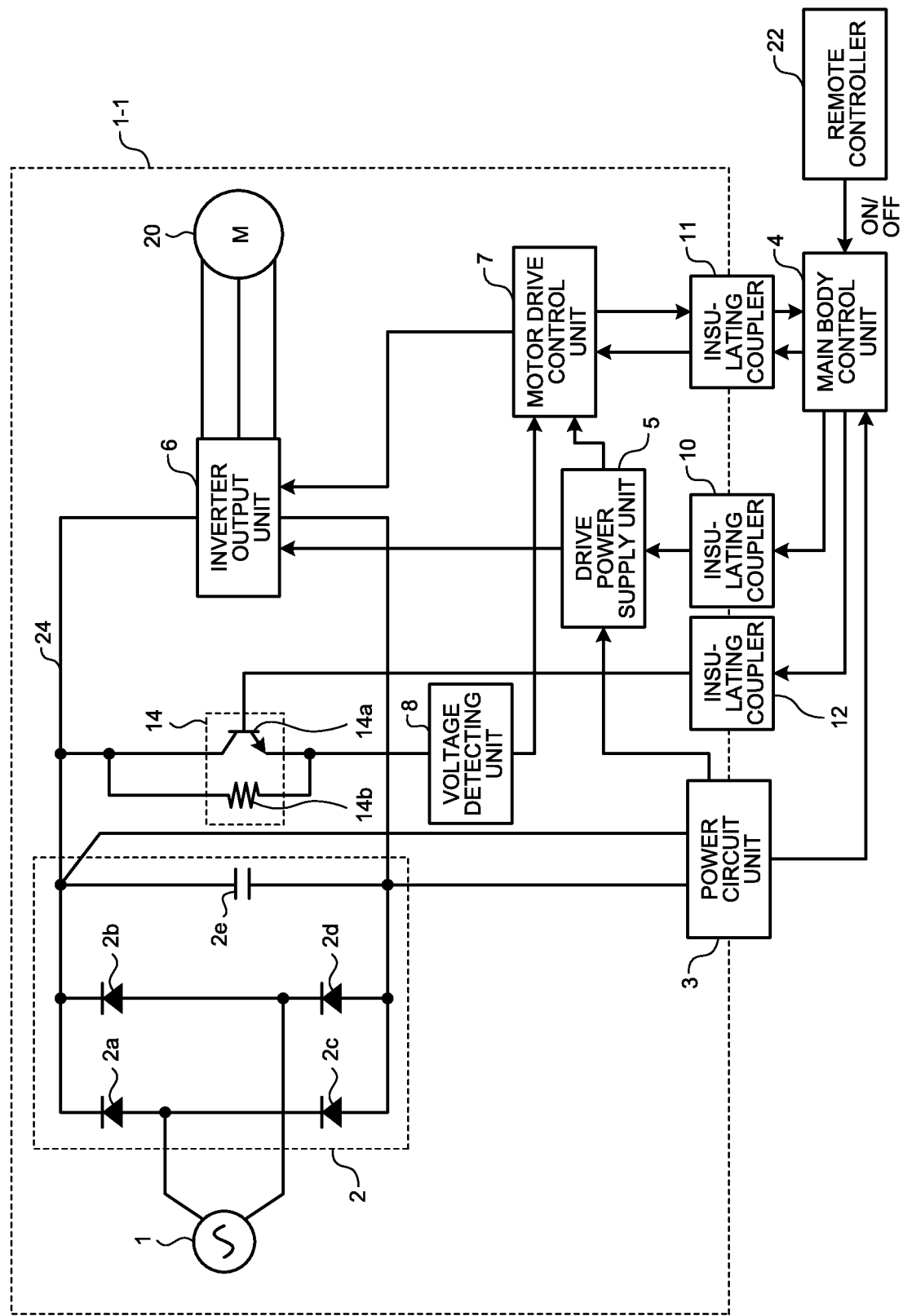
FIG. 18 is a block diagram illustrating an example of the air conditioner illustrated in FIG. 17 as the air conditioner is modified into an insulated configuration.

FIG. 18 is a block diagram illustrating an example of the air conditioner illustrated in FIG. 17 as the air conditioner is modified into the insulated configuration. In FIG. 18, the insulated configuration is achieved by inserting the insulating coupler 10 between the main body control unit 4 and the drive power supply unit 5, the insulating coupler 11 between the main body control unit 4 and the motor drive control unit 7, and the insulating coupler 12 between the main body control unit 4 and the detection result inhibiting circuit 14.

The air conditioner of FIG. 18 differs from the air conditioners of FIG. 17 in that the air conditioner of FIG. 18 includes the insulating couplers 10 to 12 while the air conditioner of FIG. 17 does not include the insulating couplers 10 to 12. The air conditioner of FIG. 18 is the same in the operation sequence itself as the air conditioner of FIG. 17, and thus, the description of the operation of the air conditioner illustrated in FIG. 18 is omitted.

As described above, according to the air conditioner of the second embodiment, the detection result inhibiting circuit operates such that the detection result from the voltage detecting unit is input to the motor drive control unit as the motor is driven, and the input of the detection result to the motor drive control unit is cut off as the motor stops being driven. It is thus possible to suppress the increase in device scale and increase in cost, and reduce power consumption as the motor stops being driven.

In addition, according to the air conditioner of the second embodiment, the current changeover switch of the detection result inhibiting circuit is controlled to be in the off state to allow the current to flow through the current limiting resistor of the detection result inhibiting circuit as the motor drive control unit is not in operation, whereby the input of the detection result of the voltage detecting unit to the motor drive control unit is substantially cut off. It is thus possible to reliably prevent the motor drive control unit from being subjected to the reverse bias.

In addition, according to the air conditioner of the second embodiment, the current changeover switch of the detection result inhibiting circuit is controlled to be in the off state to allow the current to flow through the current limiting resistor of the detection result inhibiting circuit as the drive power supply unit is not in operation, whereby the input of the detection result of the voltage detecting unit to the motor drive control unit is substantially cut off. It is thus possible to reliably prevent the motor drive control unit from being subjected to the reverse bias.

In addition, according to the air conditioner of the second embodiment, the current changeover switch of the detection result inhibiting circuit is controlled to be in the off state to allow the current to flow through the current limiting resistor of the detection result inhibiting circuit as the main body control unit is not in operation, whereby the input of the detection result of the voltage detecting unit to the motor drive control unit is substantially cut off. It is thus possible to reliably prevent the motor drive control unit from being subjected to the reverse bias.

The configuration described in the above-mentioned embodiments indicates an example of the contents of the present invention. The configuration can be combined with another well-known technique, and a part of the configuration can be omitted or changed in a range not departing from the gist of the present invention.

The invention claimed is:

1. An air conditioner to receive supply of AC power from a commercial power source and drive a motor, the air conditioner comprising:

a power generating unit to convert an AC voltage applied from the commercial power source into a DC voltage to generate drive power for driving the air conditioner;

an inverter output unit to drive the motor by using power supplied from the power generating unit;

a voltage detecting unit to detect a DC voltage applied to the inverter output unit;

a motor drive control unit to control the inverter output unit on a basis of the DC voltage detected by the voltage detecting unit;

a drive power supply unit to supply an operating power source to each of the inverter output unit and the motor drive control unit;

a main body control unit to transmit and receive signals to and from the motor drive control unit, and output a motor drive command or a motor drive stop command to the drive power supply unit;

a power circuit unit to supply operating power to the main body control unit and the drive power supply unit by using the drive power generated by the power generating unit; and a detection result inhibiting circuit to input a detection signal, based on the DC voltage detected by the voltage detecting unit, to the motor drive control unit as the motor is driven, and cut off input of the detection signal to the motor drive control unit as the motor stops being driven, wherein:

the detection result inhibiting circuit includes a current changeover switch connected to the motor drive control unit to be controlled by the motor drive control unit and a current limiting resistor connected in parallel to the current changeover switch and connected to the voltage detecting unit, the current limiting resistor having a resistance value larger than a resistance value of a resistor provided inside the voltage detecting unit, the detection result inhibiting circuit being provided on a connection circuit that transmits the detection result from the voltage detecting unit to the motor drive control unit, and the current changeover switch is in an off state to allow a current to flow through the current limiting resistor as the motor drive control unit is not in operation, to cut off the input of the detection result to the motor drive control unit.

2. The air conditioner according to claim 1, wherein
the power circuit unit is an insulated power source, and
the main body control unit is connected via insulating couplers to the drive power supply unit and the motor drive control unit.

\* \* \* \* \*